(12) United States Patent
Obana et al.

(10) Patent No.: US 9,583,754 B2
(45) Date of Patent: Feb. 28, 2017

(54) HEAT-RESISTANT INSULATING LAYER-PROVIDED SEPARATOR CONTAINING HEAT-RESISTANT RESIN AND OXIDATION-RESISTANT CERAMIC PARTICLES AND NON-AQUEOUS ELECTROLYTE SECONDARY BATTERY

(75) Inventors: Yoshiaki Obana, Kanagawa (JP); Atsushi Kajita, Fukushima (JP); Yukako Teshima, Fukuoka (JP); Kenichi Ogawa, Kanagawa (JP); Hisashi Tsujimoto, Fukushima (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 12/212,041

(22) Filed: Sep. 17, 2008

(65) Prior Publication Data
US 2009/0092900 A1  Apr. 9, 2009

(30) Foreign Application Priority Data

Oct. 3, 2007  (JP) .................................. 2007-259645

(51) Int. Cl.
| | | |
|---|---|---|
| H01M 2/16 | (2006.01) | |
| H01M 2/18 | (2006.01) | |
| H01M 4/131 | (2010.01) | |
| H01M 4/1391 | (2010.01) | |
| H01M 4/525 | (2010.01) | |
| H01M 10/0569 | (2010.01) | |
| H01M 4/04 | (2006.01) | |

(52) U.S. Cl.
CPC ......... *H01M 4/0404* (2013.01); *H01M 2/166* (2013.01); *Y02E 60/122* (2013.01)

(58) Field of Classification Search
CPC .......................... H01M 2/166; H01M 4/0404
USPC ....... 429/223, 144, 326, 330, 331, 332, 338, 429/231.3, 251, 253
See application file for complete search history.

(56) References Cited

U.S. PATENT DOCUMENTS

| | | | |
|---|---|---|---|
| 5,824,434 A | 10/1998 | Kawakami et al. | |
| 6,447,958 B1 | 9/2002 | Shinohara et al. | |
| 2004/0197667 A1* | 10/2004 | Noh .................. | H01M 10/0525 429/326 |
| 2004/0234853 A1 | 11/2004 | Adachi et al. | |
| 2006/0222955 A1 | 10/2006 | Ogawa et al. | |
| 2006/0275667 A1* | 12/2006 | Watanabe .......... | C01G 45/1228 429/231.3 |

(Continued)

FOREIGN PATENT DOCUMENTS

| | | |
|---|---|---|
| JP | 05-211059 | 8/1993 |
| JP | 06-196199 | 7/1994 |

(Continued)

OTHER PUBLICATIONS

Murai, T., Machine translation of JP 2004014405 A, Jan. 2004.*

(Continued)

*Primary Examiner* — Sean P Cullen
(74) *Attorney, Agent, or Firm* — K&L Gates LLP

(57) ABSTRACT

A heat-resistant insulating layer-provided separator includes a polyolefin layer and a heat-resistant insulating layer formed on one or both surfaces of the polyolefin layer and containing a heat-resistant resin and an oxidation-resistant ceramic particle. The heat-resistant insulating layer contains the oxidation-resistant ceramic particle in a proportion of from 60 to 90%.

8 Claims, 2 Drawing Sheets

(56) References Cited

U.S. PATENT DOCUMENTS

| | | | |
|---|---|---|---|
| 2007/0026311 A1* | 2/2007 | Obana et al. | 429/217 |
| 2008/0070107 A1* | 3/2008 | Kasamatsu et al. | 429/144 |
| 2009/0067119 A1* | 3/2009 | Katayama et al. | 361/523 |

FOREIGN PATENT DOCUMENTS

| | | |
|---|---|---|
| JP | 07-220759 | 8/1995 |
| JP | 09-283117 | 10/1997 |
| JP | 09283117 A * | 10/1997 |
| JP | 10-006453 | 1/1998 |
| JP | 2000-030686 | 1/2000 |
| JP | 2001-023602 | 1/2001 |
| JP | 2004-014405 | 1/2004 |
| JP | 2004014405 A * | 1/2004 |
| JP | 2006-059733 | 3/2006 |
| JP | 2006-286531 | 10/2006 |
| JP | 2007-227361 | 9/2007 |
| JP | 2007-280781 | 10/2007 |
| JP | 2008-098096 | 4/2008 |
| KR | 2007-0067703 | 6/2007 |
| WO | 03/019713 | 3/2003 |
| WO | WO 2006061936 A1 * | 6/2006 |
| WO | 2006/134684 | 12/2006 |
| WO | WO 2007066768 A1 * | 6/2007 |
| WO | WO 2008/062727 | 5/2008 |

OTHER PUBLICATIONS

Kohama, K., Machine translation of JP 09283117 A, Oct. 1997.*
Japanese Office Action issued on Dec. 22, 2009, for corresponding Japanese Patent Application 2007-259645.
Japanese Office Action issued Jun. 26, 2012 for corresponding Japanese Appln. No. 2010-163330.
Korean Intellctual Patent Office, Detailed Grounds for Rejection issued in connection with Korean Patent Application No. Application No. 10-2008-0096401, dated Jul. 29, 2014. (9 pages).
Office Action issued in KR Application 10-2015-0077114 on Sep. 7, 2015 (9 pages).

* cited by examiner

HEAT-RESISTANT INSULATING LAYER-PROVIDED SEPARATOR CONTAINING HEAT-RESISTANT RESIN AND OXIDATION-RESISTANT CERAMIC PARTICLES AND NON-AQUEOUS ELECTROLYTE SECONDARY BATTERY

CROSS REFERENCES TO RELATED APPLICATIONS

The present application claims priority to Japanese Patent Application JP 2007-259645 filed in the Japan Patent Office on Oct. 3, 2007, the entire contents of which is being incorporated herein by reference.

BACKGROUND

The present application relates to a heat-resistant insulating layer-provided separator and to a non-aqueous electrolyte secondary battery. In more detail, the present application relates to a heat-resistant insulating layer-provided separator, which includes a polyolefin layer and a heat-resistant insulating layer obtained by containing a prescribed proportion of an oxidation-resistant ceramic particle in a heat-resistant resin, and to a non-aqueous electrolyte secondary battery using the same.

In recent years, following diffusion of portable information electronic devices such as mobile phones, video cameras and laptop personal computers, it is devised to realize high performance, downsizing and weight saving of these devices.

As a power source for these devices, disposable primary batteries and repeatedly usable secondary batteries are used. From the viewpoint of favorable comprehensive balance among high performance, downsizing, weight saving, economy and the like, secondary batteries, in particular, lithium ion secondary batteries have been increasingly demanded.

Also, in these devices, it is further advanced to attain higher performance and more downsizing. It is also demanded to realize a high energy density for lithium ion secondary batteries.

Following this, it is advanced to attain a high capacity of lithium ion secondary batteries by not only improvement and modification of electrode materials but improvement of a battery structure.

As one of methods for attaining a high capacity, an increase of a use charge upper limit voltage (open circuit voltage in a completely charged state per pair of a positive electrode and a negative electrode) (hereinafter abbreviated as "use charge upper limit voltage") is watched.

In existing lithium ion secondary batteries, lithium cobalt oxide is used as a positive electrode, a carbon material is used as a negative electrode, and the use charge upper limit voltage is set up at from 4.1 to 4.2 V. In the lithium ion secondary batteries in which the use charge upper limit voltage is set up in such a way, in positive electrode active materials to be used for the positive electrode, such as lithium cobalt oxide, the capacity is utilized only in a proportion of from about 50 to 60% relative to a theoretical capacity.

For that reason, it is theoretically possible to utilize the residual capacity by further increasing the use charge upper limit voltage.

Actually, it is known that it is possible to attain a high energy density by regulating the use charge upper limit voltage at 4.25 V or more (see WO 03/019713).

Also, in lithium ion secondary batteries, as high capacity thereof becomes high, the energy density increases, too. Therefore, in the case where large energy is released in a superheating test or an internal short circuit test, a demand for enhancement in reliability is extremely large.

For that reason, lithium ion secondary batteries in which high reliability to such a test and high capacity are compatible with each other are earnestly demanded.

General lithium ion secondary batteries include a positive electrode containing a lithium composite oxide, a negative electrode containing a material capable of occluding and releasing a lithium ion, a separator lying between the positive electrode and the negative electrode and a non-aqueous electrolytic solution, in which the positive electrode and the negative electrode are wound via the separator, thereby configuring a group of columnar electrodes.

The separator has a function to electrically insulate the positive electrode and the negative electrode from each other and a function to hold the non-aqueous electrolytic solution. As such a separator of the lithium ion secondary battery, it is general to use a polyolefin microporous film.

This is because it is considered that in order to prevent the generation of a combustible gas or the rupture or ignition of the battery to be caused due to an abrupt increase of the battery temperature from occurring at the time when an abnormal large current flows due to induction of external short circuit or minute internal short circuit of the lithium ion secondary battery, the polyolefin microporous film shrinks or melts by its heat, thereby plugging pores to exhibit a function to shut down the ion permeation (shutdown function), too.

However, even if the shutdown function works, when the temperature of the lithium ion secondary battery further increases, there is a problem of the generation of so-called "meltdown" that the separator melts or thermally shrinks, whereby the positive electrode and the negative electrode cause short circuit on a large scale.

Also, for the purpose of enhancing the shutdown function, when heat melting properties of the separator are increased, there is a problem that the meltdown temperature of the separator is lowered.

Then, for the purpose of enhancing both shutdown properties and resistance to meltdown, for example, there is proposed a separator composed of a substrate layer including a porous film and a layer including a heat-resistant nitrogen-containing aromatic polymer such as aromatic polyamides or polyimides and a ceramic powder (see Japanese Patent No. 3175730).

SUMMARY

However, in the lithium ion secondary batteries applying a separator as described in the foregoing Japanese Patent No. 3175730, in the case where the use charge upper limit voltage is set up high, though the internal short circuit at the time of superheating or the like could be suppressed, there was involved a problem that satisfactory performance cannot be obtained with regard to high-temperature cycle properties.

In view of the foregoing, it is desirable to provide a heat-resistant insulating layer-provided separator which, even when the use charge upper limit voltage is set up high, is able to realize a non-aqueous electrolyte secondary battery which is excellent in both safety at the time of superheating and high-temperature cycle properties and a non-aqueous electrolyte secondary battery using the same.

The present inventors have found a heat-resistant insulating layer-provided separator which is prepared by forming a heat-resistant insulating layer containing a prescribed proportion of an oxidation-resistant ceramic particle in a heat-resistant resin on one or both surfaces of a polyolefin layer and applied it.

Specifically, according to an embodiment, there is provided a heat-resistant insulating layer-provided separator including a polyolefin layer and a heat-resistant insulating layer formed on one or both surfaces of the polyolefin layer and containing a heat-resistant resin and an oxidation-resistant ceramic particle, the heat-resistant insulating layer containing the oxidation-resistant ceramic particle in a proportion of from 60 to 90%.

Also, in a preferred embodiment of the heat-resistant insulating layer-provided separator according to an embodiment, the oxidation-resistant ceramic particle contains at least alumina.

Furthermore, in other preferred embodiment of the heat-resistant insulating layer-provided separator according to an embodiment, the heat-resistant resin contains at least an aromatic polyamide.

According to an embodiment, there is provided a non-aqueous electrolyte secondary battery including a positive electrode obtained by forming a positive electrode mixture layer containing a positive electrode active material on a positive electrode collector, a negative electrode obtained by forming a negative electrode mixture layer on a negative electrode collector, a heat-resistant insulating layer-provided separator and a non-aqueous electrolyte, wherein an open circuit voltage in a completely charged state per pair of a positive electrode and a negative electrode is from 4.25 to 4.55 V.

Also, in the non-aqueous electrolyte secondary battery according to an embodiment, the heat-resistant insulating layer-provided separator includes a polyolefin layer and a heat-resistant insulating layer formed on one or both surfaces of the polyolefin layer and containing a heat-resistant resin and an oxidation-resistant ceramic particle.

Furthermore, in the non-aqueous electrolyte secondary battery according to an embodiment, the heat-resistant insulating layer contains the oxidation-resistant ceramic particle in a proportion of from 60 to 90% and is disposed at least between the positive electrode and the polyolefin layer.

Also, in a preferred embodiment of the non-aqueous electrolyte secondary battery according to an embodiment, a ratio of a surface density of the positive electrode mixture layer to a surface density of the negative electrode mixture layer is from 1.90 to 2.10.

Furthermore, in other preferred embodiment of the non-aqueous electrolyte secondary battery according to an embodiment, the positive electrode active material is a positive electrode active material in which the whole or a part of the surface of at least lithium cobalt oxide is coated with an oxide containing either one or both of nickel and manganese.

According to an embodiment, the heat-resistant insulating layer-provided separator is prepared by forming a heat-resistant insulating layer containing a prescribed proportion of an oxidation-resistant ceramic particle in a heat-resistant resin on one or both surfaces of a polyolefin layer and applied. Thus, it is possible to provide a heat-resistant insulating layer-provided separator which, even when the use charge upper limit voltage is set up high, is able to realize a non-aqueous electrolyte secondary battery which is excellent in both safety at the time of superheating and high-temperature cycle properties and a non-aqueous electrolyte secondary battery using the same.

Additional features and advantages are described herein, and will be apparent from the following Detailed Description and the figures.

DETAILED DESCRIPTION

The heat-resistant insulating layer-provided separator and the non-aqueous electrolyte secondary battery according to an embodiment are hereunder described in detail with reference to the accompanying drawings. In the present specification and appended claims, the term "%" in contents, concentrations and the like are all a mass percentage unless otherwise indicated.

Figure 1:
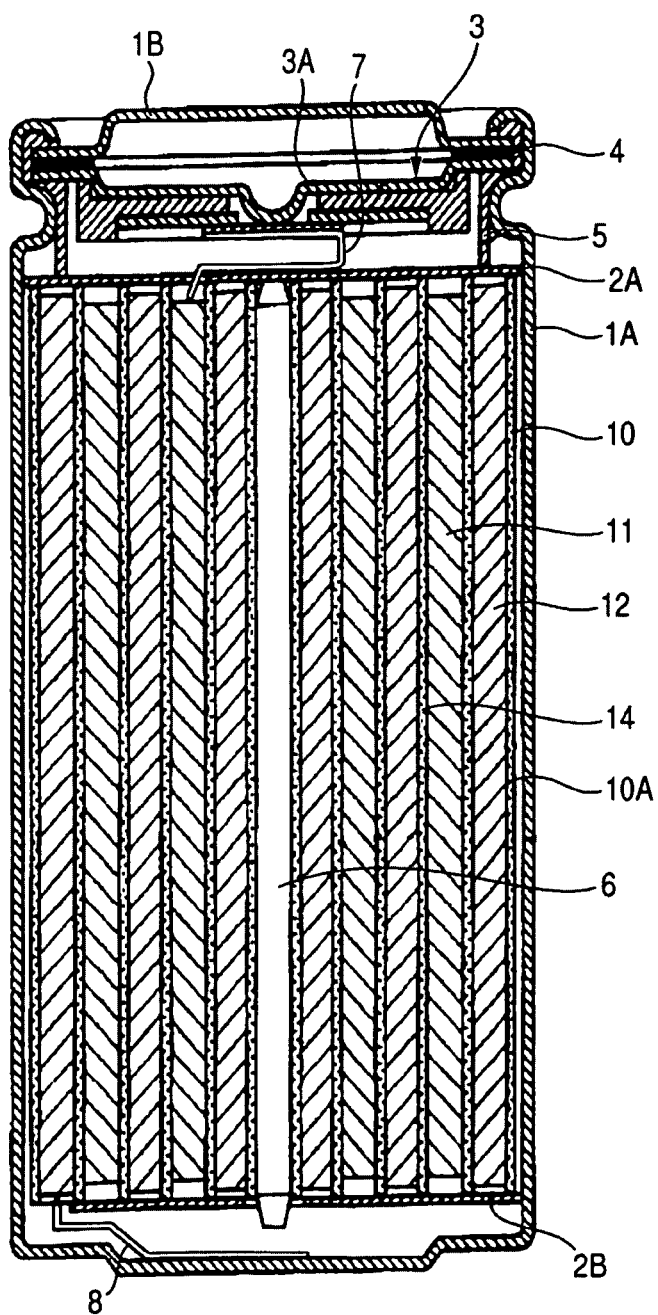
FIG. 1 is a cross-sectional view showing an example of a cylindrical secondary battery which is a non-aqueous electrolyte secondary battery according to an embodiment.

FIG. 1 is a cross-sectional view showing an example of a cylindrical secondary battery which is a non-aqueous electrolyte secondary battery according to an embodiment.

As illustrated in FIG. 1, this secondary battery has a battery element 10 in the inside of a substantially hollow columnar battery can 1A which is a part of an exterior member. The battery element 10 is one in which a positive electrode 11 and a negative electrode 12 are positioned opposing to each other via a heat-resistant insulating layer-provided separator 14 and which contains a non-illustrated non-aqueous electrolyte.

While details are described later, the heat-resistant insulating layer-provided separator 14 is incorporated in such a manner that at least a non-illustrated heat-resistant insulating layer of the heat-resistant insulating layer-provided separator 14 is disposed between the positive electrode 11 and a non-illustrated polyolefin layer of the heat-resistant insulating layer-provided separator 14.

Here, one obtained by eliminating the non-aqueous electrolyte from the battery element 10 is referred to as a wound electrode body 10A.

As the strip positive electrode, negative electrode and heat-resistant insulating layer-provided separator to be used in the preparation of the wound electrode body 10A, for example, those having a relationship of {(separator width)>(negative electrode width)>(positive electrode width)} with respect to the respective widths can be employed. Such a wound electrode body is able to prevent the growth of a dendrite crystal in the negative electrode to be caused due to the permeation from the positive electrode. Such a wound electrode body is also able to prevent an internal short circuit to be caused due to arrival of a dendrite crystal at the positive electrode.

The battery can 1A is constituted of, for example, nickel-plated steel, and one end thereof is closed, with the other end being opened. Insulating plates 2A and 2B are disposed in the inside of the battery can 1A such that the battery element 10 is interposed from the up and bottom.

In the open end of the battery can 1A, a battery lid 1B configuring a part of the exterior member is installed by caulking with a safety valve mechanism 3 and a positive temperature coefficient element (PTC element) 4 provided in the inside of this battery lid 1B via a gasket 5, and the inside of the battery can 1A is sealed.

The battery lid 1B is constituted of, for example, the same material as in the battery can 1A. The safety valve mechanism 3 is electrically connected to the battery lid 1B via the positive temperature coefficient element 4, and in the case where the pressure in the inside of the battery becomes a fixed value or more due to internal short circuit or heating from the outside or the like, a disc plate 3A is reversed, whereby electrical connection between the battery lid 1B and the battery element 10 is disconnected. When the temperature rises, the positive temperature coefficient element 4 limits a current due to an increase of a resistance value, thereby preventing abnormal heat generation to be caused due to a large current, and is constituted of, for example, a barium titanate based semiconductor ceramic. The gasket 5 is constituted of, for example, an insulating material, and asphalt is coated on the surface thereof.

The battery element 10 is wound centering on, for example, a center pin 6. A positive electrode lead 7 made of aluminum, etc. is connected to the positive electrode 11 of the battery element 10; and a negative electrode lead 8 made of copper, nickel, stainless steel, etc. is connected to the negative electrode 12. The positive electrode lead 7 is welded to the safety valve mechanism 3, whereby it is electrically connected to the battery lid 1B; and the negative electrode lead 8 is welded to the battery can 1A, whereby it is electrically connected thereto.

Figure 2:
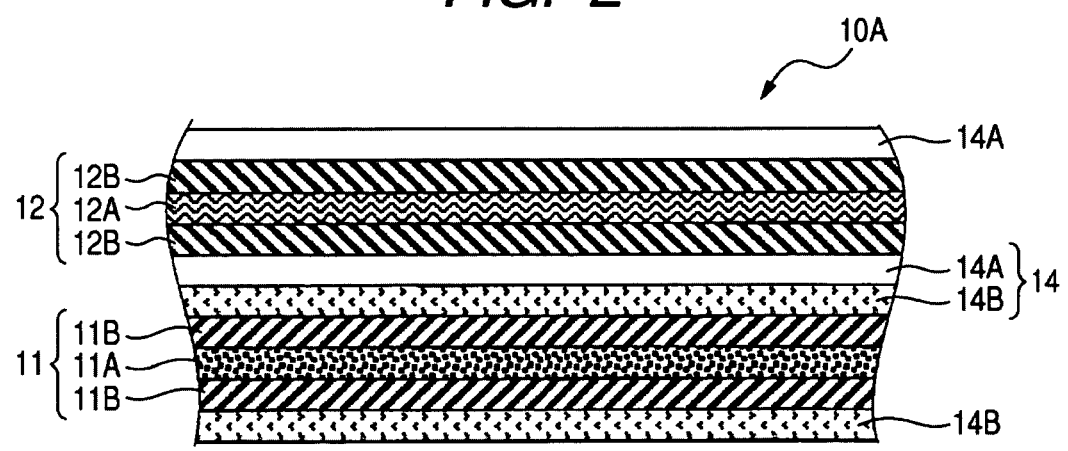
FIG. 2 is an enlarged cross-sectional view of a part of a wound electrode body in the cylindrical secondary battery as illustrated in FIG. 1.

FIG. 2 is an enlarged cross-sectional view of a part of the wound electrode body in the cylindrical secondary battery as illustrated in FIG. 1.

As illustrated in FIG. 2, the wound electrode body 10A has the positive electrode 11, the negative electrode 12 and the heat-resistant insulating layer-provided separator 14.

Here, the positive electrode 11 has a structure in which a positive electrode mixture layer 11B is coated on the both surfaces of a positive electrode collector 11A having a pair of opposing surfaces to each other. The positive electrode collector 11A is constituted of a metal foil, for example, an aluminum foil. While illustration is omitted, the positive electrode collector includes a portion where a positive electrode mixture layer is exposed without being coated in one end in the longitudinal direction thereof, and the foregoing positive electrode lead is installed in this exposed portion.

Similar to the positive electrode 11, the negative electrode 12 has a structure in which a negative electrode mixture layer 12B is coated on the both surfaces of a negative electrode collector 12A having a pair of opposing surfaces to each other. The negative electrode collector 12A is constituted of a metal foil, for example, a copper foil, a nickel foil and a stainless steel foil. While illustration is omitted, the negative electrode collector includes a portion where a negative electrode mixture layer is exposed without being coated in one end in the longitudinal direction thereof, and the foregoing negative electrode lead is installed in this exposed portion.

Furthermore, the heat-resistant insulating layer-provided separator 14 is configured to include a polyolefin layer 14A and a heat-resistant insulating layer 14B. The heat-resistant insulating layer 14B is disposed at least between the positive electrode 11 and the polyolefin layer 14A.

While the heat-resistant insulating layer 14B is disposed at least between the positive electrode 11 and the polyolefin layer 14A, so far as the heat-resistant insulating layer 14B is disposed in not the whole region but a partial region between the positive electrode 11 and the polyolefin layer 14A, such falls within the scope.

While illustration is omitted, each of the positive electrode and the negative electrode may have a structure in which the positive electrode mixture layer or the negative electrode mixture layer is coated on one surface of the positive electrode collector or the negative electrode collector each having a pair of opposing surfaces to each other, respectively. Furthermore, while illustration is omitted, the heat-resistant insulating layer may be disposed not only between the positive electrode and the polyolefin layer but between the negative electrode and the polyolefin layer. Moreover, while illustration is omitted, the heat-resistant insulating layer may be disposed only on one surface of the positive electrode or negative electrode.

[Positive Electrode]

The positive electrode mixture layer 11B contains, for example, a positive electrode material capable of occluding and releasing a lithium ion as a positive electrode active material and may also contain a conductive agent and a binder as the need arises.

Here, the positive electrode active material, the conductive agent and the binder may be uniformly dispersed, and a mixing ratio thereof does not matter.

As the positive electrode material capable of occluding and releasing lithium which is used as the positive electrode active material, lithium-containing compounds, for example, lithium oxide, lithium phosphorus oxide, lithium sulfide and a lithium-containing intercalation compound are favorable depending upon the kind of the desired battery, and mixtures of two or more kinds thereof may also be used. In order to increase the energy density, lithium-containing compounds containing lithium, a transition metal element and oxygen (O) are preferable. Of these, those containing, as the transition metal element, at least one member selected from the group consisting of cobalt (Co), nickel (Ni), manganese (Mn) and iron (Fe) are more preferable.

Examples of such lithium-containing compounds include lithium composite oxides represented by an average composition as expressed by the following formula (1) or (2).

$$Li_aCo_{(1-b)}M1_bO_{(2-c)} \quad (1)$$

In the formula (1), M1 represents at least one member selected from the group consisting of vanadium (V), copper (Cu), zirconium (Zr), zinc (Zn), magnesium (Mg), aluminum (Al), gallium (Ga), yttrium (Y) and iron (Fe); and a, b and c are each a value falling within the ranges of $(0.9 \leq a \leq 1.1)$, $(0 \leq b \leq 0.3)$ and $(-0.1 \leq c \leq 0.1)$, respectively. The composition of lithium varies depending upon the state of charge and discharge; and the value of a represents a value in the completely discharged state.

$$Li_dNi_eCo_fMn_gM2_{(1-e-f-g)}O_{(2-h)} \quad (2)$$

In the formula (2), M2 represents at least one member selected from the group consisting of vanadium (V), copper (Cu), zirconium (Zr), zinc (Zn), magnesium (Mg), aluminum (Al), gallium (Ga), yttrium (Y) and iron (Fe); and d, e, f, g and h are each a value falling within the ranges of $(0.9 \leq d \leq 1.1)$, $(0 < e < 1)$, $(0 < f < 1)$, $(0 < g < 0.5)$, $(0 \leq (1-e-f-g))$ and $(-0.1 \leq h \leq 0.1)$, respectively. The composition of lithium varies depending upon the state of charge and discharge; and the value of d represents a value in the completely discharged state.

Furthermore, examples of the lithium-containing compound include lithium composite oxides having a spinel type structure represented by an average composition as expressed by the following formula (3) and lithium composite phosphates having an olivine type structure represented by an average composition as expressed by the following formula (4). Specific examples thereof include Li$_i$Mn$_2$O$_4$ (i≅1) and Li$_j$FePO$_4$ (j≅1).

$$Li_kMn_{2-l}M3_lO_mF_n \quad (3)$$

In the formula (3), M3 represents at least one member selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and k, l, m and n are each a value falling within the ranges of (0.9≤k≤1.1), (0≤l≤0.6), (3.7≤m≤4.1) and (0≤n≤0.1), respectively. The composition of lithium varies depending upon the state of charge and discharge; and the value of k represents a value in the completely discharged state.

$$Li_oM4PO_4 \quad (4)$$

In the formula (4), M4 represents at least one member selected from the group consisting of cobalt (Co), a manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and o is a value falling within the range of (0.9≤o≤1.1). The composition of lithium varies depending upon the state of charge and discharge; and the value of o represents a value in the completely discharged state.

Besides the foregoing positive electrode materials, examples of the positive electrode material capable of occluding and releasing lithium, which is used as the positive electrode active material, include lithium-free inorganic compounds, for example, MnO$_2$, V$_2$O$_5$, V$_6$O$_{13}$, NiS and MoS.

Above all, positive electrode active materials containing a foreign element such as aluminum (Al), magnesium (Mg), zirconium (Zr) and titanium (Ti) in a solid solution state; positive electrode active materials containing a lithium nickel manganese composite oxide, etc.; positive electrode active materials obtained by coating the surface of lithium cobalt oxide with lithium manganate or nickel cobalt composite oxide each having a spinel structure; and the like are preferable from the viewpoint of the matter that they have a stable structure even at a high charge voltage.

From the viewpoint of the matter that higher electrode filling properties and cycle properties are obtainable, composite particles obtained by coating the surface of a core particle composed of any one of the lithium-containing compounds expressed by the formulae (1) to (4) with a fine particle composed of any one of other lithium-containing compounds may be used. Furthermore, composite particles obtained by coating the whole or a part of the surface of lithium cobalt oxide with an oxide containing at least one of nickel and manganese can be used. Such an oxide may form or may not form a composite oxide with lithium cobalt oxide.

Examples of the conductive agent which can be used include carbon materials, for example, acetylene black, graphite and ketjen black.

Furthermore, examples of the binder which can be used include polyvinylidene fluoride or copolymers of vinylidene fluoride or modified products thereof; fluorocarbon based resins, for example, polytetrafluoroethylene and copolymers of polytetrafluoroethylene; and acrylic resins, for example, polyacrylonitrile and polyacrylic esters. Of these, copolymers of vinylidene fluoride are especially preferable because they are excellent in durability, in particular swelling resistance.

Specific examples of the copolymer of vinylidene fluoride include a vinylidene fluoride-hexafluoropropylene copolymer, a vinylidene fluoride-tetrafluoroethylene copolymer, a vinylidene fluoride-chlorotrifluoroethylene copolymer and a vinylidene fluoride-hexafluoropropylene-tetrafluoroethylene copolymer.

Copolymers obtained by further copolymerizing the above-exemplified copolymer with other ethylenically unsaturated monomer can be exemplified.

Specific examples of the copolymerizable ethylenically unsaturated monomer include acrylic esters, methacrylic esters, vinyl acetate, acrylonitrile, acrylic acid, methacrylic acid, maleic anhydride, butadiene, styrene, N-vinylpyrrolidone, N-vinylpyridine, glycidyl methacrylate, hydroxyethyl methacrylate and methyl vinyl ether.

Such a binder may be used singly or may be used in admixture of two or more kinds thereof.

The content of the binder in the positive electrode mixture layer is preferably in the range of from 0.5 to 7%, and more preferably in the range of from 1.2 to 4%. This is because when the content of the binder is too low, the binding properties are insufficient so that it is difficult to bind the positive electrode active material or the like to the positive electrode collector; and when the content of the binder is too high, a binder with low electron conductivity and ionic conductivity coats the positive electrode active material so that the charge-discharge efficiency may possibly be lowered.

[Negative Electrode]

The negative electrode mixture layer 12B contains any one or two or more kinds of negative electrode materials capable of occluding and releasing a lithium ion as a negative electrode active material, and similar to the positive electrode mixture layer, it may also contain a conductive agent and a binder as the need arises. Furthermore, the negative electrode mixture layer 12B may contain other material which does not contribute to charge, for example, a viscosity modifier.

Here, for example, the negative electrode active material, the conductive agent and the binder may be uniformly dispersed, and a mixing ratio thereof does not matter.

Examples of the negative electrode material capable of occluding and releasing lithium include carbon materials, for example, hardly graphitized carbon, easily graphitized carbon, natural or artificial graphite, pyrolytic carbons, cokes, vitreous carbons, organic polymer compound burned materials, carbon fibers and active carbon.

Here, examples of the cokes include pitch coke, needle coke and petroleum coke. The organic polymer compound burned material as referred to herein refers to a material obtained through carbonization by burning a polymer material such as phenol resins and furan resins at an appropriate temperature, and a part thereof is classified into hardly graphitized carbon or easily graphitized carbon.

Such a carbon material is preferable because a change in the crystal structure to be generated at the time of charge and discharge is very small, a high charge-discharge capacity can be obtained, and good cycle properties can be obtained. In particular, graphite is preferable because its electrochemical equivalent is large, and a high energy density can be obtained. Hardly graphitized carbon is preferable because excellent properties are obtainable. Moreover, a material having a low charge-discharge potential, specifically one having a charge-discharge potential close to a lithium metal, is preferable because it is possible to easily realize a high energy density of the battery.

In the case where a carbon material is used as the negative electrode material, a ratio of a surface density of the positive electrode mixture layer of the positive electrode to a surface density of the negative electrode mixture layer of the negative electrode [(area density of the positive electrode mixture layer)/(area density of the negative electrode mixture layer)] is preferably in the range of from 1.90 to 2.10. This is because when the ratio of a surface density in mixture layer is more than 2.10, there may be the case where metallic lithium deposits on the surface of the negative electrode so that the charge-discharge efficiency or safety may possibly be lowered; and when the ratio of a surface density in mixture layer is less than 1.90, a negative electrode material which does not participate in the reaction with lithium (Li) which is an electrode reaction material increases so that the energy density may possibly be lowered.

This secondary battery is designed such that an open circuit voltage at the time of complete charge (namely, a use charge upper limit voltage of the battery) falls within the range of from 4.25 to 4.55 V. Therefore, even when the same positive electrode active material is concerned, this secondary battery is larger in the release amount of lithium per unit mass than a battery having an open circuit voltage of 4.20 V at the time of complete charge. In response thereto, the amounts of the positive electrode active material and the negative electrode active material are regulated, thereby obtaining a high energy density. In particular, in the case where the open circuit voltage at the time of complete charge falls within the range of 4.35 V or more and not more than 4.45 V, the effect which can be actually utilized is high.

Examples of other negative electrode materials capable of occluding and releasing lithium include materials capable of occluding and releasing lithium and containing, as a constitutional element, at least one of a metal element and a semi-metal element. This is because by using such a material, a high energy density can be obtained. In particular, the joint use of such a material with the carbon material is more preferable because not only a high energy density can be obtained, but excellent cycle properties can be obtained.

This negative electrode material may be a single body or an alloy of a metal element or a semi-metal element. The negative electrode material may have one or two or more kinds of such a phase in at least a part thereof. In an embodiment, the alloy includes alloys containing at least one metal element and at least one semi-metal element in addition to alloys composed of two or more metal elements. The negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). These may be crystalline or amorphous.

Of these, ones containing, as a constitutional element, a metal element or a semi-metal element belonging to the Group 4B in the short form of the periodic table are preferable, and ones containing, as a constitutional element, at least one of silicon (Si) and tin (Sn) are especially preferable as the negative electrode material. This is because silicon (Si) and tin (Sn) have large ability for occluding and releasing lithium (Li), and a high energy density can be obtained.

Examples of alloys of tin (Sn) include alloys containing, as a second constitutional element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of silicon (Si) include alloys containing, as a second constitutional element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin (Sn) or compounds of silicon (Si) include compounds containing oxygen (O) or carbon (C), and these compounds may contain the foregoing second constitutional element in addition to tin (Sn) or silicon (Si).

Furthermore, examples of other negative electrode materials capable of occluding and releasing lithium include other metal compounds and polymer materials. Examples of other metal compounds include oxides, for example, $MnO_2$, $V_2O_5$ and $V_6O_{13}$; sulfides, for example, NiS and MoS; and lithium nitrides, for example, $LiN_3$. Examples of other polymer materials include polyacetylene, polyaniline and polypyrrole.

Examples of the conductive agent include graphites, for example, artificial graphite and expandable graphite; carbon blacks, for example, acetylene black, ketjen black, channel black and furnace black; conductive fibers such as carbon fibers and metal fibers; metal powders, for example, a copper powder and a nickel powder; and organic conductive materials, for example, polyphenylene derivatives. Of these, acetylene black, ketjen black and carbon fibers are preferable.

The content of the conductive agent is preferably in the range of from 0.1 to 30 parts by mass, and more preferably in the range of from 0.5 to 10 parts by mass based on 100 parts by mass of the negative material. The conductive agent may be used singly or may be used in admixture of plural kinds thereof.

Furthermore, examples of the binder include polytetrafluoroethylene and polyvinylidene fluoride. The binder may be used singly or may be used in admixture of plural kinds thereof.

Moreover, examples of the viscosity modifier include carboxymethyl cellulose.

[Heat-Resistant Insulating Layer-Provided Separator]

The heat-resistant insulating layer-provided separator 14 is one which isolates the positive electrode 11 and the negative electrode 12 from each other and makes a lithium ion pass therethrough while preventing a short circuit of current to be caused due to the contact between the both electrodes and is provided with the polyolefin layer 14A and the heat-resistant insulating layer 14B.

The polyolefin layer 14A is a porous film composed of a polyolefin based synthetic resin, for example, polypropylene and polyethylene and is constituted of an insulating thin film having large ion permeability and prescribed mechanical strength. A structure in which two or more kinds of porous films are laminated may be employed. The polyolefin layer including a polyolefin based porous film has excellent separation properties between the positive electrode and the negative electrode and is able to further reduce an internal short circuit or a lowering of the open circuit voltage.

The heat-resistant insulating layer 14B contains a heat-resistant resin and an oxidation-resistant ceramic particle.

As described previously, the heat-resistant insulating layer may be disposed at least between the positive electrode and the polyolefin layer. Examples of such a heat-resistant insulating layer include a layer in which a mixture of a heat-resistant resin and an oxidation-resistant ceramic particle is formed in a layered state and a layer in which the respective materials are formed in a layered state.

In the present specification and appended claims, the "heat-resistant resin" as referred to herein refers to a polymer containing a nitrogen atom and an aromatic ring in a principal chain thereof, and examples thereof include an aromatic polyamide (hereinafter sometimes referred to as "aramid"), an aromatic polyimide (hereinafter sometimes referred to as "polyimide") and an aromatic polyamide-imide.

Examples of the aramid include a meta-oriented aromatic polyamide (hereinafter sometimes referred to as "meta-aramid") and a para-oriented aromatic polyamide (hereinafter sometimes referred to as "para-aramid"). Of these, para-aramid is preferable because it is easy to become porous.

The "para-aramid" as referred to herein is one obtained by condensation polymerization of a para-oriented aromatic diamine and a para-oriented aromatic dicarboxylic acid halide and is one substantially composed of a repeating unit in which an amide bond is bonded at a para-position of an aromatic ring or an orientation position corresponding thereto (an orientation position extending coaxially or in parallel in an opposing direction, for example, 4,4'-biphenylene, 1,5-naphthalene and 2,6-naphthalene).

Specific examples thereof include para-aramids of a para-orientation type or having a structure corresponding to a para-orientation type, for example, poly(p-phenylene terephthalamide), poly(p-benzamide), poly(4,4'-benzanilide terephthalamide), poly(p-phenylene-4,4'-biphenylenedicarboxylic acid amide), poly(p-phenylene-2,6-naphthalenedicarboxylic acid amide), poly(2-chloro-p-phenylene terephthalamide) and a p-phenylene terephthalamide/2,6-dichloro-p-phenylene terephthalamide copolymer.

The para-aramid is preferably a para-aramid having an intrinsic viscosity of preferably from 1.0 to 2.8 dL/g, and more preferably one having an intrinsic viscosity of from 1.7 to 2.5 dL/g because it is possible to form a low-viscosity solution upon being dissolved in a polar organic solvent, and excellent coating properties are revealed.

When the intrinsic viscosity is less than 1.0 dL/g, there may be the case where satisfactory film strength is not obtainable. When the intrinsic viscosity exceeds 2.8 dL/g, a stable para-aramid solution is hardly formed, and there may be the case where the para-aramid deposits, whereby the fabrication into a film is hardly achieved.

Examples of the foregoing polar organic solvent include polar amide based solvents and polar urea based solvents, and specific examples thereof include N,N-dimethylformamide, N,N-dimethylacetamide, N-methyl-2-pyrrolidone and tetramethylurea. However, it should not be construed that the present application is limited thereto.

The para-aramid is preferably a porous and fibrillated polymer. Such a fibrillated polymer is microscopically in a non-woven fabric form, is in a layered state, has porous spaces and forms a so-called para-aramid porous resin.

On the other hand, the polyimide is preferably a wholly aromatic polyimide manufactured by, for example, condensation polymerization of an aromatic diacid anhydride and a diamine.

Specific examples of the foregoing diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl) hexafluoropropane and 3,3',4,4'-biphenyltetracarboxylic dianhydride.

Specific examples of the foregoing diamine include oxydianiline, p-phenylenediamine, benzophenonediamine, 3,3'-methylenedianiline, 3,3'-diaminobenzophenone, 3,3'-diaminodiphenylsulfone and 1,5'-naphthalenediamine. However, it should not be construed that the present application is limited thereto.

In the case where a porous film is prepared directly from the polyimide solution, a polyimide which is soluble in a solvent can be favorably used. Examples of such a polyimide include polyimides which are a polycondensate of 3,3',4,4'-diphenylsulfonetetracarboxylic dianhydride and an aromatic diamine.

As the polar organic solvent to be used for the polyimide, in addition to the above-exemplified polar organic solvents in the case of the aramid, dimethyl sulfoxide, cresol, o-chlorophenol and the like can be favorably used.

Furthermore, it is preferable that the polyimide is porous. For example, it is possible to make a solid film porous by boring by machining or laser beam machining or the like. During the preparation of a polyimide film by a solution casting method, it is possible to prepare a porous film by controlling a molding condition of the polyimide such as a polymer concentration at the time of coating. Furthermore, it is possible to form a uniform and microporous film by a solution having an arbitrary polymer concentration by complexation of the ceramic powder. Moreover, it is possible to control the air permeability by the content of the ceramic powder.

The heat-resistant insulating layer is one containing an oxidation-resistant ceramic particle preferably in a proportion of from 60 to 90%, and more preferably in a proportion of from 65 to 85%.

When the content of the oxidation-resistant ceramic particle is less than 60%, there is a possibility that deterioration in a high charge region cannot be suppressed, whereas when it exceeds 90%, there may be the case where the separator becomes brittle so that it is hardly handled.

Examples of the oxidation-resistant ceramic particle include ceramic particles made of an electrically insulating metal oxide, metal nitride or metal carbide or the like. For example, alumina, silica, titanium dioxide, zirconium oxide, etc. can be favorably used. Such a particle may be used singly or can be used in admixture of two or more kinds thereof.

The shape of the oxidation-resistant ceramic particle is not particularly limited, and spherical particles or particles having a random shape can be used.

Furthermore, from the viewpoints of influences against the strength of the separator and smoothness on the coated surface, the oxidation-resistant ceramic particle has an average particle size of primary particles of preferably not more than 1.0 μm, more preferably not more than 0.5 μm, and further preferably not more than 0.1 μm. Such an average particle size of primary particles can be measured by a method of analyzing a photograph obtained by an electron microscope by a particle size analyzer.

When the average particle size of primary particles of the oxidation-resistant ceramic particle exceeds 1.0 μm, there may be the case where the separator is brittle, and the coated surface is rough.

For example, in the case where a mixture of the heat-resistant resin and the oxidation-resistant ceramic particle is formed in a layered state, such an oxidation-resistant ceramic particle is tangled with the heat-resistant resin and captured, whereby it is entirely or partly dispersed and contained in the separator.

The heat-resistant insulating layer-provided separator may further have a substrate layer, and examples of such a substrate layer include porous fabrics or non-woven fabrics composed of an electrically insulating organic or inorganic fiber or pulp, papers and porous films. Of these, non-woven fabrics, papers and porous films are preferable from the standpoints of costs and thin thickness.

Specifically, examples of organic fibers include fibers composed of a thermoplastic polymer, for example, rayon, vinylon, polyesters, acrylic resins, polystyrene and nylon; and natural fibers, for example, Manila hemp. Examples of inorganic fibers include glass fibers and alumina fibers.

The weight of the heat-resistant insulating layer-provided separator per unit area is preferably not more than 40 g/m$^2$, and more preferably not more than 15 g/m$^2$.

Furthermore, a porosity of the heat-resistant insulating layer-provided separator is determined depending upon electron permeability, ionic permeability, raw material or thickness, and in general, it is preferably in the range of from 30 to 80%, and more preferably in the range of from 35 to 50%. This is because when the porosity is too low, the ionic conductivity is lowered, whereas when the porosity is too high, a short circuit may possibly be generated.

Moreover, for example, the thickness of the heat-resistant insulating layer-provided separator is preferably in the range of from 10 to 300 μm, more preferably in the range of from 15 to 70 μm, and further preferably in the range of from 15 to 25 μm. This is because when the thickness of the heat-resistant insulating layer-provided separator is too thin, a short circuit may possibly be generated, whereas when the thickness is too thick, the filling amount of the positive electrode material is lowered.

The heat-resistant insulating layer-provided separator preferably contains 10% or more of a thermoplastic polymer which melts at not higher than 260° C., more preferably contains 30% or more of such a thermoplastic polymer, and further preferably contains 40% or more of such a thermoplastic polymer.

When such a thermoplastic polymer melts at the time of temperature rising, it is able to plug pores of the heat-resistant insulating layer-provided separator. In the case where such a thermoplastic polymer is used for a separator of a lithium ion secondary battery, from the viewpoint of a shutdown function, the thermoplastic polymer is preferably a polymer which melts at not higher than 260° C., and more preferably a polymer which melts at not higher than 200° C. The melting temperature is appropriate as a shutdown temperature, and therefore, it is preferably about 100° C. or higher.

Examples of such a thermoplastic polymer include polyolefin resins, acrylic resins, styrene resins, polyester resins and nylon resins.

In particular, polyolefin resins, for example, polyethylene including low density polyethylene, high density polyethylene and linear polyethylene and low-molecular weight waxes thereof, and polypropylene are favorably used because of appropriateness of the melting temperature thereof and easiness of availability. These can be used singly or in admixture of two or more kinds thereof.

[Non-Aqueous Electrolyte]

For example, a non-aqueous electrolyte is contained in all or a part of the foregoing heat-resistant insulating layer-provided separator 14, positive electrode mixture layer 11B and negative electrode mixture layer 12B. As such a non-aqueous electrolyte, for example, a non-aqueous electrolytic solution having an electrolyte salt dissolved in a non-aqueous solvent can be used.

From the viewpoint of the matter that high ionic conductivity of an electrolytic solution is obtained, it is preferable to use one containing, for example, lithium hexafluorophosphate ($LiPF_6$) as the electrolyte salt.

A concentration of lithium hexafluorophosphate ($LiPF_6$) is preferably in the range of from 0.1 to 2.0 moles/kg in the electrolytic solution. This is because the ionic conductivity can be more increased within this range.

Other electrolyte salt may farther be mixed and used as the electrolyte salt. Examples of other electrolyte salt include $LiAsF_6$, $LiClO_4$, $LiB(C_6H_5)_4$, $LiCH_3SO_3$, $LiCF_3SO_3$, $LiN(SO_2CF_3)_2$, $LiN(SO_2C_2F_5)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiC(SO_2CF_3)_3$, $LiAlCl_4$, $LiSiF_6$, $LiCl$ and $LiBr$. Other electrolyte salt may be mixed singly and used, or plural kinds thereof may be mixed and used.

The electrolyte salt may contain an organic lithium salt in which an electron withdrawing organic substituent such as a carbonyl group and a sulfonyl group is bonded via an oxygen atom to a boron (B) atom as an anion center.

Specifically, the following can be exemplified as the organic lithium salt in which an electron withdrawing organic substituent such as a carbonyl group and a sulfonyl group is bonded via an oxygen atom to a boron (B) atom as an anion center.

The atom belonging to the Group IIIb to the Group Vb as an anion center may be any of B (boron), N (nitrogen), P (phosphorus), Ga (gallium), Al (aluminum) and Si (silicon). Taking into consideration the bonding number, an atom belonging to the Group IIIb to the Group IVb is preferable, and an atom belonging to the Group IIIb is especially preferable. B (boron) is the most suitable as the atom as an anion center. That is, this is because not only boron (B) has a small atomic weight as 10.8, but it is able to achieve bonding with four bonding hands as an element to be contained in an organic material more than oxygen (O) or nitrogen (N), and it has an ability to bond to many electron withdrawing organic substituents via an oxygen atom.

The reason why the atom as an anion center and the electron withdrawing organic substituent are not bonded directly to each other but the oxygen atom is made to lie therebetween resides in the matter that since the oxygen atom has high electronegativity, stabilizes the atom as an anion center and has only two bonding hands, it is able to bond the electron withdrawing organic substituent in a state of low steric hindrance. The electron withdrawing organic substituent withdraws an electron via the oxygen atom relative to the atom as an anion center and lowers an electron density of the atom as an anion center to make it hard to take out an electron from the anion center, thereby preventing the oxidation of the anion from occurring.

Examples of the electron withdrawing organic substituent include a carbonyl group, a sulfonyl group, an amino group, a cyano group and a halogenated alkyl group. Of these, a carbonyl group and a sulfonyl group are especially favorable because they can be easily synthesized.

Specific examples of the foregoing organic lithium slat include those represented by the following formulae (5) and (6).

$$LiBXX' \qquad (5)$$

$$LiBF_2X \qquad (6)$$

In the formulae (5) and (6), X and X' each represents an electron widthdrawing organic substituent having oxygen bonded to the boron (B) atom, and for example, X and X' each independently represents —O—C(=O)—(CRR')$_n$'C(=O)—O— or —O—S(=O)—O—(CRR')$_n$—O—S(=O)—O—; R and R' each independently represents an alkyl group, a hydrogen atom (H) or a halogen atom (for example, F and Cl); and n represents an integer of from 0 to 5.

Furthermore, examples of other organic lithium salts which can be favorably used include difluoro[oxolato-O,O'] lithium borate and lithium bisoxalate borate.

As the non-aqueous solvent, for example, cyclic carbonic acid esters such as ethylene carbonate and propylene carbonate can be used. It is preferable to use either one of ethylene carbonate and propylene carbonate, in particular a mixture of the both. This is because cycle properties can be enhanced.

In addition to these cyclic carbonic acid esters, it is preferable to use a mixture with a chain carbonic acid ester such as diethyl carbonate, dimethyl carbonate, ethylmethyl carbonate and methylpropyl carbonate as the non-aqueous solvent. This is because high ionic conductivity is obtained.

Furthermore, it is preferable that vinylene carbonate or 4-fluoroethylene carbonate is contained as the non-aqueous solvent. This is because a coating film can be formed on the negative electrode; decomposition of an ionic metal complex such as difluoro[oxolato-O,O'] lithium borate and lithium bisoxalate borate on the negative electrode can be suppressed; and cycle properties can be enhanced.

The content of vinylene carbonate or 4-fluoroethylene carbonate is preferably in the range of from 0.1 to 30% in the non-aqueous electrolyte. This is because when the content of vinylene carbonate or 4-fluoroethylene carbonate is less than 0.1%, there is a possibility that an effect for enhancing cycle properties is low, whereas when it exceeds 30%, decomposition on the negative electrode excessively occurs so that the charge-discharge efficiency may possibly be lowered.

Moreover, examples of other non-aqueous solvents include butylene carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, acetonitrile, glutaronitrile, adiponitirile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulforane, dimethyl sulfoxide and trimethyl phosphate.

The non-aqueous solvent may be used singly or may be used in admixture of two or more kinds thereof.

Next, one example of a method for manufacturing the foregoing secondary battery is described.

The foregoing cylindrical secondary battery can be manufactured in the following manner.

First of all, the positive electrode 11 is prepared. For example, in case of using a granular positive electrode active material, a positive electrode active material and optionally, a conductive agent and a binder are mixed to prepare a positive electrode mixture, which is then dispersed in a dispersion medium such as N-methyl-2-pyrrolidone to prepare a positive electrode mixture slurry.

Subsequently, this positive electrode mixture slurry is coated on the positive electrode collector 11A, dried and compression molded by a roll press, etc. to form the positive electrode mixture layer 11B.

The negative electrode 12 is also prepared. For example, in case of using a granular negative electrode active material, a negative electrode active material and optionally, a conductive agent and a binder are mixed to prepare a negative electrode mixture, which is then dispersed in a dispersion medium such as N-methyl-2-pyrrolidone and water to prepare a negative electrode mixture slurry. Thereafter, this negative electrode mixture slurry is coated on the negative electrode collector 12A, dried and compression molded by a roll press, etc. to form the negative electrode mixture layer 12B.

Furthermore, the heat-resistant insulating layer-provided separator 14 is prepared. First of all, a micro pore forming inorganic salt is dissolved in a dispersion medium such as N-methyl-2-pyrrolidone, and a heat-resistant resin is dissolved in this dispersion to obtain a heat-resistant resin solution. Subsequently, an oxidation-resistant ceramic particle is added to obtain a heat-resistant insulating layer forming slurry. Moreover, the thus obtained heat-resistant insulating layer forming slurry is coated on one or both surfaces of a microporous polyolefin resin film which becomes the polyolefin layer 14A by a doctor blade, etc. and dried. Thereafter, the dried film of the heat-resistant insulating layer forming slurry is washed with water to remove the micro pore forming inorganic salt, thereby forming micro pores. There is thus formed the heat-resistant insulating layer 14B. Alternatively, the heat-resistant insulating layer 14B may also be formed by coating the above-obtained heat-resistant insulating layer forming slurry on one or both surfaces of a microporous polyolefin resin film which becomes the polyolefin layer 14A by a doctor blade, etc.; bringing it into direct contact with water to insolubilize the heat-resistant resin; and further washing the heat-resistant resin with water to remove the micro pore forming inorganic salt, thereby forming micro pores.

Subsequently, the positive electrode lead 7 is led out from the positive electrode collector 11A, and the negative electrode lead 8 is led out from the negative electrode collector 12A. Thereafter, for example, the positive electrode 11 and the negative electrode 12 are wound via the heat-resistant insulating layer-provided separator 14 to form the wound electrode body 10A; a tip of the positive electrode lead 7 is welded to the safety valve mechanism 3; a tip of the negative electrode lead 8 is welded to the battery can 1A; and the wound positive electrode 11 and negative electrode 12 are interposed between a pair of the insulating plates 2A and 2B and contained in the inside of the battery can 1A. After containing the positive electrode 11 and the negative electrode 12 in the inside of the battery can 1A, a non-illustrated non-aqueous electrolytic solution is injected into the inside of the battery can 1A, thereby impregnating the heat-resistant insulating layer-provided separator 14 therewith. Thereafter, the battery lid 1B, the safety valve mechanism 3 and the positive temperature coefficient element 4 are fixed to the open end of the battery can 1A via the gasket 5 by caulking There is thus accomplished the cylindrical secondary battery as illustrated in FIGS. 1 and 2.

According to the above-described secondary battery, when charged, a lithium ion is released from the positive electrode mixture layer 11B and occluded in the negative electrode material capable of occluding and releasing lithium to be contained in the negative electrode mixture layer 12B via a non-illustrated non-aqueous electrolyte. Next, when discharged, the lithium ion occluded in the negative electrode material capable of occluding and releasing lithium to be contained in the negative electrode mixture layer 12B is released and occluded in the positive electrode mixture layer 11B via the non-aqueous electrolyte.

EXAMPLES

Examples according to an embodiment are hereunder described in more detail with reference to the following Examples and Comparative Examples. Concretely, the cylindrical secondary batteries as shown in FIGS. 1 and 2 were prepared by carrying out the operations described in each of these Examples and Comparative Examples, and performances thereof were evaluated.

Example 1-1

Preparation of Positive Electrode

First of all, LiOH and a coprecipitated hydroxide represented by $Co_{0.98}Al_{0.01}Mg_{0.01}(OH)_2$ were mixed in a ratio of Li to all transition metals of 1/1 (by mole) in a mortar. Subsequently, this mixture was heat treated in an air atmosphere at 800° C. for 12 hours and pulverized to obtain a lithium-cobalt composite oxide (composition formula: $LiCo_{0.98}Al_{0.01}Mg_{0.01}O_2$, BET specific surface area: 0.44 m$^2$/g, average particle size: 6.2 µm) (hereinafter sometimes referred to as "lithium-cobalt composite oxide (A)") and a lithium-cobalt composite oxide (composition formula: $LiCo_{0.98}Al_{0.01}Mg_{0.01}O_2$, BET specific surface area: 0.20 m$^2$/g, average particle size: 16.7 µm) (hereinafter sometimes referred to as "lithium-cobalt composite oxide (B)").

Thereafter, the obtained lithium-cobalt composite oxides (A) and (B) were mixed in a ratio of the lithium-cobalt composite oxide (A) to the lithium-cobalt composite oxide (B) of 85/15 (by mass) to obtain a positive electrode active material I. The X-ray diffraction analysis by CuKα revealed that the positive electrode active material I had an R-3 rhombohedral layered rock salt structure.

Next, the positive electrode active material I, nickel oxide having an average particle size of 1 µm and manganese oxide having an average particle size of 1 µm were mixed in a ratio of the positive electrode active material I to nickel oxide to manganese oxide of 96/2/2 (by mass) and dry mixed utilizing a mechano fusion system, manufactured by Hosokawa Micron Corporation, thereby coating nickel oxide and manganese oxide on the positive electrode active material I.

Thereafter, the resulting positive electrode active material I was burnt in air at 950° C. for 10 hours to obtain a positive electrode active material II having a structure in which the surface of the positive electrode active material I was coated with nickel oxide and manganese oxide.

This positive electrode active material II was defined as a positive electrode active material to be used in the preparation of a positive electrode of this Example. As to the average particle size, a large difference from the positive electrode active material I was not observed.

Next, the obtained active electrode active material was mixed with ketjen black as a conductive agent and polyvinylidene fluoride as a binder to prepare a positive electrode mixture. Subsequently, this positive electrode mixture was dispersed in N-methyl-2-pyrrolidone (NMP) as a solvent to prepare a positive electrode mixture slurry. The positive electrode mixture slurry was coated on the both surfaces of a positive electrode collector composed of a strip aluminum foil having a thickness of 15 µm, dried and compression molded by a roll press to form a positive electrode mixture layer. There was thus prepared a positive electrode.

Thereafter, an aluminum-made positive electrode lead was installed in the positive electrode collector.

As a result of examination, the positive electrode mixture layer was found to have a density (surface density) per unit area of 3.65 g/cm$^2$.

<Preparation of Negative Electrode>

Next, a granular artificial graphite powder (BET specific surface area: 3.0 m$^2$/g) as a negative electrode material, a vapor grown carbon fiber as a conductive agent, a styrene butadiene rubber (SBR) as a binder and carboxymethyl cellulose were mixed together with ion exchanged water to prepare a negative electrode mixture slurry.

Subsequently, the negative electrode mixture slurry was coated on the both surfaces of a negative electrode collector composed of a strip copper foil having a thickness of 8 µm, dried and compression molded by a roll press to form a negative electrode mixture layer. There was thus prepared a negative electrode.

Thereafter, a nickel-made negative electrode lead was installed in the negative electrode collector.

As a result of examination, the negative electrode mixture layer was found to have a density (surface density) per unit area of 1.70 g/cm$^2$. The amount of each of the positive electrode material and the negative electrode material was designed such that the open circuit voltage at the time of complete charge was 4.35 V.

<Preparation of Heat-Resistant Insulating Layer-Provided Separator>

Next, dried anhydrous calcium chloride was dissolved in NMP to prepare a 6% calcium chloride solution. Subsequently, an aramid resin (in a fibrous state) was added in the obtained NMP solution of calcium chloride to prepare an NMP solution of an aramid resin. Subsequently, alumina was further added in the obtained NMP solution of an aramid resin in a ratio of the aramid resin to alumina of 40/60 (by mass) to prepare an aramid solution having alumina dispersed therein. Subsequently, the aramid solution having alumina dispersed therein was coated on one surface of a microporous polyethylene separator having a thickness of 16 µm by a doctor blade and dried by hot air at 80° C. Furthermore, a film of the aramid resin was thoroughly washed with pure water to remove the calcium chloride, thereby simultaneously forming micro pores on the film, followed by drying.

In this way, a 4 µm-thick heat-resistant insulating layer was formed on one surface of the microporous polyethylene separator, thereby preparing a heat-resistant insulating layer-provided separator.

In the heat-resistant insulating layer, pores were irregularly formed. As a result of measurement of the cross section by a scanning electron microscope (SEM), the heat-resistant insulating layer had an average pore size of about 0.7 µm and a porosity of about 50%.

<Preparation of Non-Aqueous Electrolyte>

On the other hand, a solution obtained by dissolving LiPF$_6$ as an electrolyte salt in a solvent of a mixture of ethylene carbonate, dimethyl carbonate, methylethyl carbonate and 4-fluoroethylene carbonate in a proportion of ethylene carbonate to dimethyl carbonate to methylethyl carbonate to 4-fluoroethylene carbonate of 23/67/6/4 (by mass) was used as a non-aqueous electrolytic solution. $LiPF_6$ was dissolved in a concentration of 1.5 moles/kg.

<Preparation of Wound Electrode Body>

Next, the obtained positive electrode and negative electrode were laminated via the obtained heat-resistant insulating layer-provided separator and spirally would several times to prepare a wound electrode body of a jelly-roll type.

An electrode length between the positive electrode and the negative electrode was regulated using a 3.5-φ winding core so as to have an element diameter of 17.20 mm.

The widths of the strip separator, the negative electrode and the positive electrode were regulated so as to have a relationship of {(separator width)>(negative electrode width)>(positive electrode width)}.

<Assembling of Cylindrical Secondary Battery>

Next, the prepared wound electrode body was interposed between a pair of insulating plates; the negative electrode lead was welded to a battery can; the positive electrode lead was welded to a safety valve mechanism; and the wound electrode body was contained in the inside of the battery can.

Thereafter, the non-aqueous electrolytic solution was injected into the inside of the battery can, and a battery lid was caulked with the battery can via a gasket, thereby obtaining a cylindrical secondary battery having an outer diameter of 18 mm and a height of 65 mm of this Example.

A part of the specification of the cylindrical secondary battery of each of the Examples and Comparative Examples is shown in Table 1.

Examples 1-2 and 1-3 and Comparative Examples 1-1 to 1-3

A cylindrical secondary battery of each of the Examples and Comparative Examples was obtained by repeating the same operations as in Example 1-1, except for changing the ratio of aramid to alumina in the heat-resistant insulating layer as shown in Table 1.

Comparative Example 1-4

The same operations as in Example 1-1 were repeated, except for changing the proportion of aramid to alumina in the heat-resistant insulating layer as shown in Table 1. However, a cylindrical secondary battery could not be prepared.

Comparative Example 1-5

A cylindrical secondary battery of this Comparative Example was obtained by repeating the same operations as in Example 1-1, except for setting up the use charge upper limit voltage at 4.20 V.

TABLE 1

| | Use charge upper limit voltage (V) | Positive electrode active material | Heat-resistant insulating layer Component | Heat-resistant insulating layer Disposition | Ratio of surface density (positive electrode/ negative electrode) | Rated capacity (mAh) | High-temperature cycle properties (%) | Result of heating test |
|---|---|---|---|---|---|---|---|---|
| Example 1-1 | 4.35 | Ni—Mn-coated $LiCoO_2$ | Aramid/alumina: 40/60 | Positive electrode side | 2.15 | 2855 | 86 | ○ |
| Example 1-2 | 4.35 | Ni—Mn-coated $LiCoO_2$ | Aramid/alumina: 20/80 | Positive electrode side | 2.15 | 2860 | 86 | ○ |
| Example 1-3 | 4.35 | Ni—Mn-coated $LiCoO_2$ | Aramid/alumina: 10/90 | Positive electrode side | 2.15 | 2850 | 89 | ○ |
| Comparative Example 1-1 | 4.35 | Ni—Mn-coated $LiCoO_2$ | Aramid/alumina: 100/0 | Positive electrode side | 2.15 | 2850 | 40 | ○ |
| Comparative Example 1-2 | 4.35 | Ni—Mn-coated $LiCoO_2$ | Aramid/alumina: 50/50 | Positive electrode side | 2.15 | 2840 | 52 | ○ |
| Comparative Example 1-3 | 4.35 | Ni—Mn-coated $LiCoO_2$ | Aramid/alumina: 8/92 | Positive electrode side | 2.15 | 2860 | 86 | X |
| Comparative Example 1-4 | 4.35 | Ni—Mn-coated $LiCoO_2$ | Aramid/alumina: 0/100* | Positive electrode side | 2.15 | 2840 | — | — |
| Comparative Example 1-5 | 4.20 | Ni—Mn-coated $LiCoO_2$ | Aramid/alumina: 10/90 | Positive electrode side | 2.25 | 2640 | 90 | ○ |

*Impossible to prepare a battery

Example 2-1

A cylindrical secondary battery of this Example was obtained by repeating the same operations as in Example 1-1, except for forming the heat-resistant insulating layer on the both surfaces on the positive electrode side and the negative electrode side. On that occasion, the heat-resistant insulating layer was formed in a thickness of 2 μm on each surface of the microporous polyethylene separator, with the total thickness of the both layers being 4 μm.

Comparative Example 2-1

A cylindrical secondary battery of this Comparative Example was obtained by repeating the same operations as in Example 1-1, except for forming the heat-resistant insulating layer on the negative electrode side.

A part of the specification of the cylindrical secondary battery of each of the Example and Comparative Example is shown in Table 2.

TABLE 2

| | Use charge upper limit voltage (V) | Positive electrode active material | Heat-resistant insulating layer | | Ratio of surface density (positive electrode/ negative electrode) | Rated capacity (mAh) | High-temperature cycle properties (%) | Result of heating test |
|---|---|---|---|---|---|---|---|---|
| | | | Component | Disposition | | | | |
| Example 2-1 | 4.35 | Ni—Mn-coated LiCoO$_2$ | Aramid/alumina: 10/90 | Both electrodes | 2.15 | 2850 | 89 | ◯ |
| Comparative Example 2-1 | 4.35 | Ni—Mn-coated LiCoO$_2$ | Aramid/alumina: 10/90 | Negative electrode side | 2.15 | 2856 | 52 | ◯ |

Examples 3-1 to 3-4

A cylindrical secondary battery of each of the Examples was obtained by repeating the same operations as in Example 1-1, except for changing the ratio of surface density of the positive electrode mixture layer to the negative electrode mixture layer as shown in Table 3.

A part of the specification of the cylindrical secondary battery of each of the Examples is shown in Table 3.

TABLE 3

| | Use charge upper limit voltage (V) | Positive electrode active material | Heat-resistant insulating layer | | Ratio of surface density (positive electrode/ negative electrode) | Rated capacity (mAh) | High-temperature cycle properties (%) | Result of heating test |
|---|---|---|---|---|---|---|---|---|
| | | | Component | Disposition | | | | |
| Example 3-1 | 4.35 | Ni—Mn-coated LiCoO$_2$ | Aramid/alumina: 10/90 | Positive electrode side | 1.90 | 2705 | 89 | ◯ |
| Example 3-2 | 4.35 | Ni—Mn-coated LiCoO$_2$ | Aramid/alumina: 10/90 | Positive electrode side | 1.95 | 2740 | 89 | ◯ |
| Example 3-3 | 4.35 | Ni—Mn-coated LiCoO$_2$ | Aramid/alumina: 10/90 | Positive electrode side | 2.10 | 2820 | 86 | ◯ |
| Example 3-4 | 4.35 | Ni—Mn-coated LiCoO$_2$ | Aramid/alumina: 10/90 | Positive electrode side | 2.20 | 2900 | 50 | ◯ |

[Performance Evaluation]
<Initial Charge and Discharge>

The prepared cylindrical secondary battery in each of the Examples and Comparative Examples was subjected to constant current-constant voltage charge (CCCV charge) at 25° C. with a current corresponding to 0.1 C at the use charge upper limit voltage as shown in Tables 1 to 3. Subsequently, the cylindrical secondary battery was charged and kept at 45° C. for 2 days. Subsequently, the resulting cylindrical secondary battery was kept at 23° C. for one day. Furthermore, the cylindrical secondary battery was discharged with a current corresponding to 0.2 C until it reached 3.0 V. Thereafter, the charge and discharge were repeated 5 times with a current corresponding to 0.5 C at the use charge upper limit voltage as shown in Tables 1 to 3 and within the range of 3.0 V.

The discharge capacity at the fifth cycle was defined as a rated discharge capacity. The rated discharge capacity (rated capacity) per gram of the positive electrode active material is shown in Tables 1 to 3.

<High-Temperature Cycle Test>

The cylindrical secondary battery of each of the Examples and Comparative Examples having been subjected to the initial charge and discharge was subjected to constant current-constant voltage charge (CCCV charge) at 25° C. at the use charge upper limit voltage as shown in Tables 1 to 3. Subsequently, the cylindrical secondary battery was discharged with 0.5 C, thereby defining an initial capacity.

Subsequently, the obtained cylindrical secondary battery in each of the Examples and Comparative Examples was again subjected to charge and discharge at 25° C.; a discharge capacity at the fifth cycle and a discharge capacity at the 200th cycle were examined; and a capacity retention rate (high-temperature cycle properties) was calculated. The obtained results are shown in Tables 1 to 3.

On that occasion, the charge was carried out in such a manner that after performing constant current-constant voltage charge at 0.7 C until the use charge upper limit voltage, a charge current was decayed to 50 mA at the use charge upper limit voltage; and the discharge was carried out until a terminal voltage reached 3.0 V at a fixed current of 0.5 C.

A capacity retention rate at the 200th cycle was determined as a ratio of the discharge capacity at the 200th cycle to the discharge capacity at the fifth cycle {(discharge capacity at the 200th cycle)/(discharge capacity at the fifth cycle)×100(%)}.

<Heating Test>

The cylindrical secondary battery of each of the Examples and Comparative Examples having been subjected to the initial charge and discharge was charged at 25° C. with a fixed current of 0.5 C to the use charge upper limit voltage as shown in Tables 1 to 3 and then charged at a constant voltage to 50 mA. Subsequently, the cylindrical secondary battery was superheated in an oven at a rate of 5° C./min from 25° C. to 135° C. and then allowed to stand at 135° C. for 3 hours. On that occasion, the battery surface temperature was evaluated, and the case where the battery was burnt was defined to be "poor" (×), whereas the case where the battery was not burnt was defined to be "good" (◯). The specimen number (n) was 3. The obtained results are shown in Tables 1 to 3.

It is understood from Table 1 that when the ratio of aramid to alumina is from 40/60 to 10/90, a high capacity retention rate at the high-temperature cycle is exhibited, and the results of the heating test are all satisfactory. On the other hand, it is understood that when the ratio of aramid to alumina is from 100/0 to 50/50, while the results of the heating test are satisfactory, the high-temperature cycle properties are remarkably lowered.

In case of using the heat-resistant insulating layer-provided separator having a ratio of aramid to alumina of 8/92, it is understood that the results of the heating test are deteriorated. Furthermore, in case of using only alumina, a separator could not be prepared so that assembling of a battery was not attained.

This is considered as follows. That is, when the ratio of aramid to alumina is from 100/0 to 50/50, since the aramid as a heat-resistant resin is adhered to polyethylene as a substrate, the heat shrinkage of the polyethylene separator at the time of heating can be suppressed, thereby bringing high resistance in the heating test. However, since the battery is exposed at a high charge voltage, it is considered that the battery is oxidized and deteriorated so that the deterioration at the time of high-temperature cycle is large.

Then, it is supposed that by increasing the proportion of alumina as the oxidation-resistant ceramic particle, the oxidation deterioration in a high charge region can be prevented, and by containing the heat-resistant resin, the heat shrinkage can be prevented, thereby obtaining satisfactory results of the heating test.

Comparative Example 1-5 showed the experimental results obtained by using lithium cobalt oxide coated with Ni—Mn as a positive electrode active material and setting up the open circuit voltage at the time of complete charge at 4.20 V. At that time, the ratio of surface density was 2.25. While illustration in the table, even in case of any ratio of aramid to alumina, a high capacity retention rate at the high-temperature cycle and satisfactory results of the heating test are obtained. Furthermore, while not illustration in the table, different from the examples shown in Table 3, even when the ratio of surface density is 2.15 or more, high high-temperature cycle properties are exhibited.

However, it is understood that since the charge potential of the positive electrode is low, the utilization rate of the positive electrode is low, and therefore, only a low battery capacity is obtained.

It is understood from Table 2 that in the example in which the heat-resistant insulating layer is disposed on the negative electrode side, though good results are obtained in the heating test, the high-temperature cycle properties are lowered, and therefore, the heat-resistant insulating layer is required to be disposed on the positive electrode side.

It is understood from Table 3 that when the ratio of surface density is in the range of from 1.90 to 2.10, high cycle properties and satisfactory results of the heating test are obtained.

On that occasion, when the ratio of surface density is too low, since the mass of the negative electrode becomes relatively large as compared with the mass of the positive electrode, the battery cell capacity tends to become small. On the other hand, it is understood that when the ratio of surface density is 2.15 or more, both the cycle properties and the results of the heating test are lowered. This is considered that since the total lithium charge capacity to be extracted from the positive electrode becomes relatively excessively large relative to the total lithium discharge capacity to be received by the negative electrode, when charged, metallic lithium exhibiting high reactivity with the electrolytic solution deposits on the negative electrode, resulting in deterioration.

While the present application has been described with reference to the foregoing Examples and Comparative Examples as well as some embodiments, it should not be construed that the present application is limited thereto, and various changes and modifications can be made within the scope thereof.

For example, in the foregoing embodiments, while the case of a secondary battery provided with a wound battery element having a negative electrode and a positive electrode laminated therein has been described, the present application can be similarly applied to the case of a secondary battery provided with a plate-like battery element having a structure in which a pair of a positive electrode and a negative electrode is folded or laminated or a laminated battery element having a structure in which plural positive electrodes and negative electrodes are laminated.

In the foregoing embodiments, the case of using a battery can or a film-like exterior member has been described. However, the present application can be similarly applied to batteries having other shape, for example, a so-called rectangular type, coin-shaped type or button-shaped type.

Furthermore, in the foregoing embodiments and Examples and Comparative Examples, a so-called lithium ion secondary battery in which the capacity of the negative electrode is expressed by the capacity component due to occlusion and release of lithium has been described. However, the present application can be similarly applied to a so-called lithium metal secondary battery using a lithium metal as the negative electrode active material, in which the capacity of the negative electrode is expressed by the capacity component due to deposition and dissolution of lithium; or a secondary battery in which by making the charge capacity of a negative electrode material capable of occluding and releasing lithium smaller than the charge capacity of a positive electrode, the capacity of the negative electrode is expressed by the total sum of the capacity component due to occlusion and release of lithium and the capacity component due to deposition and dissolution of lithium.

Moreover, as described previously, while the present application is concerned with a battery using lithium as an electrode reaction material, the technical thought of the present application can also be applied to the case of using other alkali metals such as sodium (Na) and potassium (K), alkaline earth metal such as magnesium (Mg) and calcium (Ca), or other light metals such as aluminum.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
   a positive electrode including a positive electrode mixture layer comprising a positive electrode active material on a positive electrode collector, wherein the positive electrode active material comprises a lithium cobalt oxide, and at least a part of the lithium cobalt oxide is coated with an oxide comprising nickel and manganese;
   a negative electrode including a negative electrode mixture layer on a negative electrode collector, wherein the negative electrode mixture layer comprises artificial graphite, and a ratio of a surface density of the positive electrode mixture layer to a surface density of the negative electrode mixture layer is from 1.90 to 2.15;
   a heat-resistant insulating layer-provided separator; and
   a non-aqueous electrolyte comprising $LiPF_6$ as an electrolyte salt in a solvent of a mixture of ethylene carbonate, dimethyl carbonate, methylethyl carbonate and 4-fluoroethylene carbonate, wherein the non-aqueous electrolyte secondary battery is configured to operate at an open circuit voltage in a completely charged state per pair of the positive electrode and the negative electrode from 4.35 V to not more than 4.55 V, the heat-resistant insulating layer-provided separator includes a polyolefin layer disposed between the positive and negative electrodes, and a heat-resistant insulating layer comprising a heat-resistant resin and oxidation-resistant ceramic primary particles dispersed therein, the oxidation-resistant ceramic primary particles comprise at least alumina, the heat-resistant insulating layer comprises the oxidation-resistant ceramic primary particles in a mass proportion of from 60 to 90% of the mass of the oxidation-resistant ceramic primary particles and the heat-resistant resin, and the heat-resistant resin is an aramid in a fibrous state.

2. The non-aqueous electrolyte secondary battery according to claim 1, wherein the mass proportion ranges from 80 to 90%.

3. The non-aqueous electrolyte secondary battery according to claim 1, wherein the mass proportion ranges from 65 to 85%.

4. The non-aqueous electrolyte secondary battery according to claim 1, wherein the oxidation-resistant ceramic primary particles consist of alumina.

5. The non-aqueous electrolyte secondary battery according to claim 1, wherein the heat-resistant resin comprises at least an aromatic polyamide.

6. The non-aqueous electrolyte secondary battery according to claim 1, wherein the porosity of the heat-resistant insulating layer-provided separator ranges from 35% to 50%.

7. The non-aqueous electrolyte secondary battery according to claim 1, wherein the heat-resistant insulating layer-provided separator comprises 10% or more by mass proportion of a thermoplastic polymer that melts at a temperature of 260° C. or less, the mass proportion being with respect to the whole heat-resistant insulating layer-provided separator.

8. The non-aqueous electrolyte secondary battery according to claim 1, wherein the non-aqueous electrolyte secondary battery is configured to operate at an open circuit voltage in a completely charged state per pair of a positive electrode and a negative electrode of not more than 4.45 V.

* * * * *